(12) United States Patent
Chun et al.

(10) Patent No.: US 9,018,313 B2
(45) Date of Patent: Apr. 28, 2015

(54) POLYMER-ENCAPSULATED NANOPARTICLE SYSTEMS

(71) Applicant: Hewlett-Packard Development Company, L.P., Fort Collins, CO (US)

(72) Inventors: Doris Pik-Yiu Chun, Santa Clara, CA (US); Hou T. Ng, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 13/692,174

(22) Filed: Dec. 3, 2012

(65) Prior Publication Data

US 2013/0095239 A1 Apr. 18, 2013

Related U.S. Application Data

(62) Division of application No. 12/572,726, filed on Oct. 2, 2009, now abandoned.

(51) Int. Cl.
| | | |
|---|---|---|
| *C08C 19/25* | (2006.01) | |
| *B05D 7/00* | (2006.01) | |
| *C08C 19/20* | (2006.01) | |
| *C08C 19/22* | (2006.01) | |
| *C08C 19/24* | (2006.01) | |
| *C08F 220/56* | (2006.01) | |

(52) U.S. Cl.
CPC . *B05D 7/00* (2013.01); *C08C 19/20* (2013.01); *C08C 19/22* (2013.01); *C08C 19/25* (2013.01); *C08C 19/24* (2013.01); *C08F 220/56* (2013.01)

(58) Field of Classification Search
None
See application file for complete search history.

(56) References Cited

U.S. PATENT DOCUMENTS

| | | | |
|---|---|---|---|
| 4,665,107 A | 5/1987 | Micale | |
| 6,822,782 B2 | 11/2004 | Honeyman et al. | |
| 7,279,121 B2 | 10/2007 | Hayashi | |
| 7,411,720 B2 | 8/2008 | Honeyman et al. | |
| 2005/0107478 A1 | 5/2005 | Klimov et al. | |
| 2005/0142567 A1* | 6/2005 | Su et al. | 435/6 |
| 2005/0270628 A1 | 12/2005 | Miyazaki et al. | |
| 2007/0007677 A1 | 1/2007 | Blair et al. | |
| 2008/0138430 A1* | 6/2008 | Owens et al. | 424/497 |
| 2009/0227711 A1 | 9/2009 | Carlini et al. | |

OTHER PUBLICATIONS

Haschick, Macromolecules, vol. 41, No. 14, 2008, p. 5077-5081.*
Park, et al, "Preparation and electrophoretic response of poly(methyl methacrylate-co-methacrylic acid) coated TiO$_2$ nanoparticles for electronic paper application", Current Applied Physics 7 (2007),349-351.
Yu, et al., "Titanium dioxide core/polymer shell hybrid composite particles prepared by two-step dispersion polymerization", Colloids and Surfaces A: Physicochem. Eng. Aspects 237 (2004) 87-93.

(Continued)

*Primary Examiner* — Robert C Boyle
(74) *Attorney, Agent, or Firm* — Dierker & Assocaties, P.C.

(57) ABSTRACT

A method for forming a system including polymer-encapsulated nanoparticles includes forming an inverse mini-emulsion including a continuous phase of a non-aqueous medium and a discontinuous phase of at least: a plurality of nanoparticles having a polar surface, and at least one of i) a polar, water-soluble, or water-miscible monomer, or ii) a polar, water-soluble, or water-miscible pre-polymer. The method further includes initiating polymerization of the at least one of the monomer or the prepolymer to form a polymer coating on each of the plurality of nanoparticles in the non-aqueous medium.

16 Claims, 3 Drawing Sheets

POLYMER-ENCAPSULATED NANOPARTICLES IN NON-AQUEOUS MEDIUM

(56) References Cited

OTHER PUBLICATIONS

Vestal, et al. "Atom Transfer Radical Polymerization Synthesis and Magnetic Characterization of $MnFe_2O_4$/Polystyrene Core/Shell Nanoparticles", J. Am. Chem. Soc. 2002, 124, 14312-14313.

Mahdavian, et al. "Nanocomposite particles with core-shell morphology III: preparation and characterization of nano $Al_2O_3$- poly-(styrene-methyl methacrylate) particles via miniemulsion polymerization", Polym. Bull. (2009) 63:329-340.

* cited by examiner

INVERSE MINI-EMULSION

MICROFLUIDIZATION AND IN SITU POLYMERIZATION

POLYMER-ENCAPSULATED NANOPARTICLES IN NON-AQUEOUS MEDIUM

POLYMER-ENCAPSULATED NANOPARTICLE SYSTEMS

CROSS-REFERENCE TO RELATED APPLICATION

This application is a division of co-pending U.S. application Ser. No. 12/572,726, filed Oct. 2, 2009, which is incorporated by reference herein in its entirety.

BACKGROUND

The present disclosure relates generally to polymer-encapsulated nanoparticle systems.

Encapsulated particles have become increasingly useful in a variety of biological applications (e.g., drugs, cosmetics, etc.), printing applications (e.g., laser printing, digital commercial printing, etc.), and electronic applications (e.g., electronic inks, light emitting polymers, e-field displays, etc.). The production of such particles often involves multiple steps.

BRIEF DESCRIPTION OF THE DRAWINGS

Features and advantages of embodiments of the present disclosure will become apparent by reference to the following detailed description and drawing, in which like reference numerals correspond to similar, though not necessarily identical, components. For the sake of brevity, reference numerals or features having a previously described function may or may not be described in connection with other drawings in which they appear.

DETAILED DESCRIPTION

Steps of embodiments of the method disclosed herein may advantageously be performed in a single container. The continuous processes enable polymer-coated/encapsulated particles to form in situ, directly in a desirable non-aqueous medium. This advantageously eliminates the need to perform a post-polymerization step to remove water in exchange for the non-aqueous medium. As such, the methods disclosed herein may be relatively cost-effective, energy-efficient, waste-efficient, and time-efficient (especially when compared to processes requiring the removal of water). Furthermore, in some embodiments, the process may be configured to generate polymer-encapsulated nanoparticles that are reversibly chargeable in the presence of an electric field.

Figure 1A:
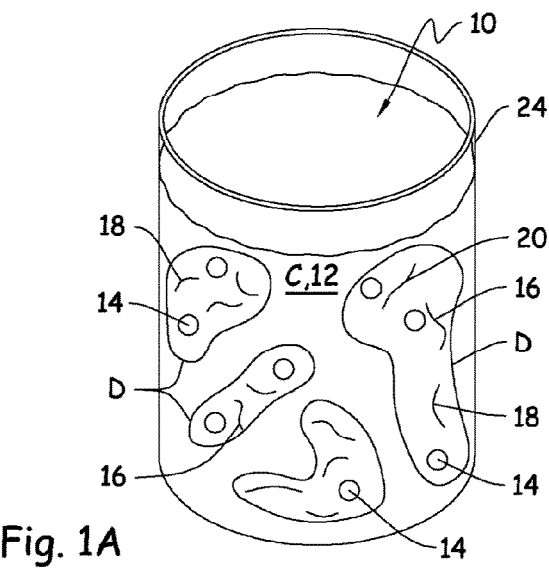
FIGS. 1A and 1B together schematically illustrate an embodiment of a method for forming embodiments of the polymer-encapsulated nanoparticles.
Figure 1B:
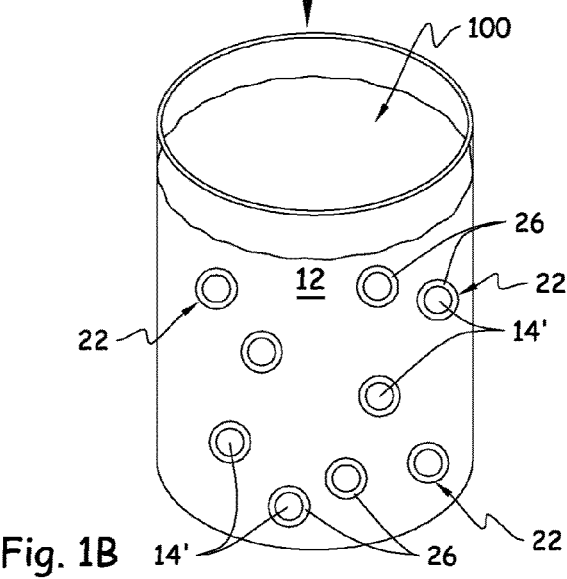
Figure 2:
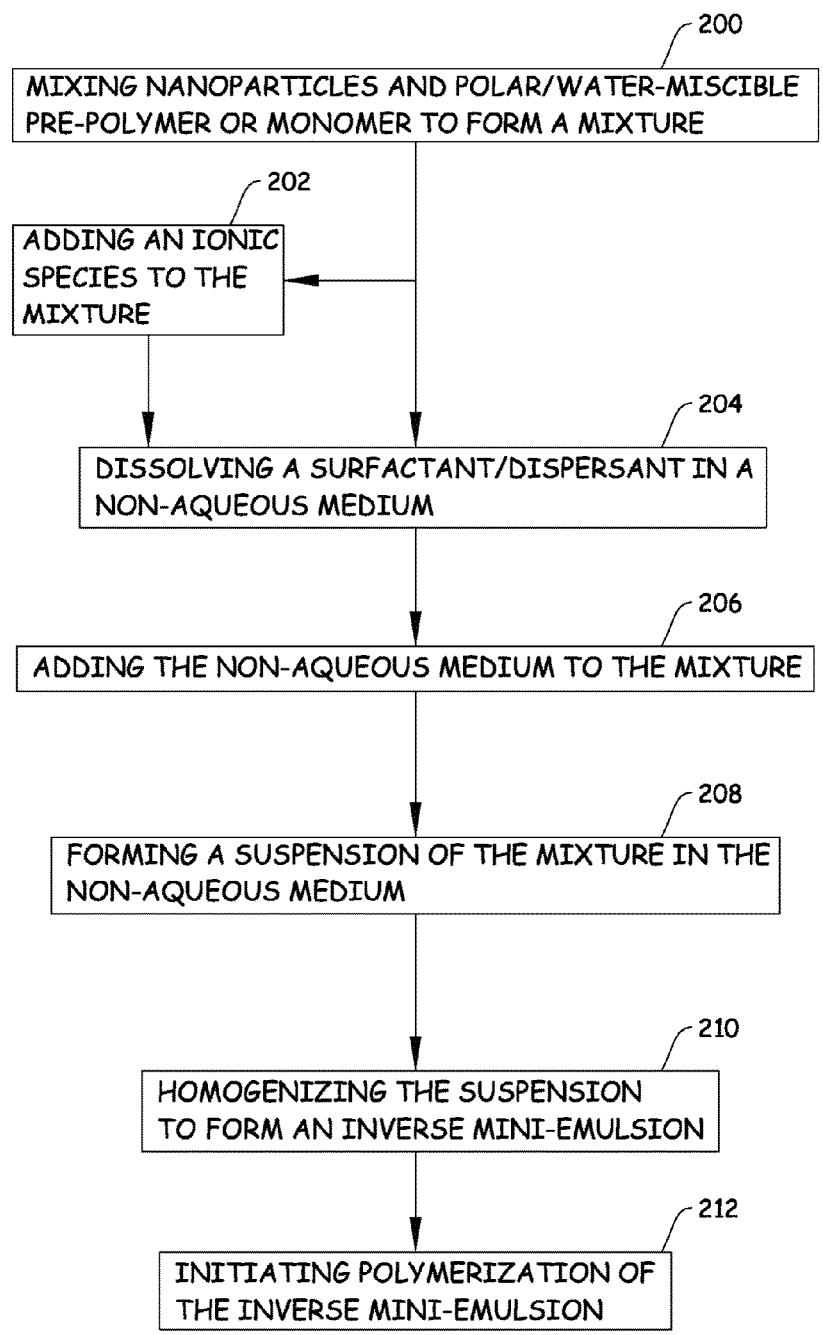
FIG. 2 is a flow diagram illustrating more detailed embodiments of the method for forming embodiments of the polymer-encapsulated nanoparticles.

FIGS. 1A and 1B respectively depict schematic illustrations of an inverse mini-emulsion (which is a direct emulsion of an aqueous phase in a non-aqueous phase), and polymer-encapsulated nanoparticles in a non-aqueous medium formed after in situ polymerization of the inverse mini-emulsion. FIG. 2 illustrates embodiments of the method of forming the inverse emulsion, and forming polymer-encapsulated nanoparticles in a non-aqueous medium from the inverse emulsion. The various Figures will be referenced throughout the following description.

The mini-emulsion 10 shown in FIG. 1A includes a continuous phase C and a discontinuous phase D. In the embodiments disclosed herein, the continuous phase C generally includes a non-aqueous medium 12, and the discontinuous phase includes one or more hydrophilic components (discussed further hereinbelow). As such, the mini-emulsion 10 is comparable to a water-in-oil emulsion. Formation of the mini-emulsion 10 will be discussed herein in reference to FIGS. 2 and 1A together.

As shown in FIG. 2 at reference numeral 200 (alone or in combination with the step shown at reference numeral 202), the method begins by mixing the components that will ultimately form the discontinuous phase D. As shown schematically in FIG. 1A, the discontinuous phase D may include many different components. As non-limiting examples, the discontinuous phase D includes at least a plurality of nanoparticles 14 having a polar surface (or surface modified to achieve a polar surface) and i) polar, water-miscible, and/or water soluble monomer(s) 16 and/or ii) polar, water-miscible, and/or water soluble pre-polymer(s) 20. Furthermore, in some instances, it may be desirable to add one or more polar, water-soluble, or water-miscible polymers 18 with the monomers 16 and/or pre-polymers 20. While all of the monomers 16, polymers 18, and pre-polymers 20 are shown in the discontinuous phase D in FIG. 1A, it is to be understood that one or any combination of such materials 16, 18, 20 may be included in the discontinuous phase D. As such, very generally, the method begins by mixing the nanoparticles 14 with the monomer(s) 16 and/or pre-polymer(s) 20 (with or without polymer(s) 16) to form a mixture. Such mixing may be accomplished mechanically.

Numerous examples of the nanoparticles 14 and the monomers 16, polymers 18 and pre-polymers 20 are provided hereinbelow. However, it is to be understood that any suitable starting materials (e.g., 14, 16, 18, 20) may be selected for the discontinuous phase D as long as the selected components satisfy surface compatibility (i.e., the surface of such components are chemically compatible (e.g., all surfaces are polar)) and are able to emulsify in the continuous phase C. This enables one to select from a wide variety of materials, and to tailor the resulting system 100 (shown in FIG. 1B) for a particular application.

Examples of suitable nanoparticles 14 (which ultimately form the solid particle core 14' of the encapsulated nanoparticles 22) include, but are not limited to, colorants (e.g., organic pigments, inorganic pigments, or dyes), quantum dots, or metal colloids. Such nanoparticles 14 inherently have a polar surface, or are modified to have a polar surface. When it is desirable to modify the polarity of the nanoparticle 14 surface, surfactants are added to the mixture. More specific non-limiting examples of the nanoparticles 14 include carbon black, copper phthalocyanine, titania, and silica. The particle 14 loading in the mixture generally ranges from about 3 wt % to about 10 wt % of the total weight of the mixture.

The initial size (i.e., diameter) of the nanoparticles 14 may range from about 0.2 microns to about 5 microns, depending upon the material selected. It is to be understood that the particle core 14' of the encapsulated particle 22 (shown in FIG. 1B) size depends, at least in part, on the extent of homogenization (discussed further hereinbelow). The size of the encapsulated particle 22 is generally less than 1 micron, and thus the particle core 14' is also smaller than 1 micron.

It is to be understood that monomers 16, polymers 18, and/or pre-polymers 20 may be used, and that such monomers 16, polymers 18, and/or pre-polymers 20 are polar, water-soluble, and/or water-miscible. Examples of suitable monomers 16 include, but are not limited to, radical polymerizable acrylic monomers such as acrylic acid, methacrylic acid, acrylamide, methacrylamide, hydroxyethyl-methacrylate (HEMA), and any ethylene-oxide-base methacrylate. Furthermore, examples of suitable polymers 18 include, but are not limited to polyethylene glycol methacrylate (PEGMA) or any polymer that is to be formed from the polymerization of the selected monomer(s) 16 and/or pre-polymer(s) 20. Still further, examples of suitable pre-polymers 20 include TDI-polyether pre-polymers (e.g., a non-limiting example of which includes VERSATHANE® 1090, which is commercially available from Air Products, Allentown, Pa.), or polyethylene-oxide based MDI pre-polymers with a viscosity less than 1000 cP (e.g., non-limiting examples of which include the DESMODUR® VP.PU series, which are commercially available from Bayer Corp., Pittsburgh, Pa.).

When monomer(s) 16 (with or without polymer(s) 18) are used in the mixture that will form the discontinuous phase D, it is desirable to include an initiator (e.g., 2,2'-Azobis(2-methylpropionamidine) dihydrochloride, 4,4'-Azobis(4-cyanovaleric acid), or the like), and when pre-polymers 20 are used in the mixture that will form the discontinuous phase D, it is desirable to include water-soluble cross-linker(s) (e.g., any diamine, such as VERSALINK® from Air Products, Allentown, Pa., and JEFFAMINE® D230 from Huntsman International, LLC, The Woodlands, Tex.).

Still other components that may be present in the mixture that will form the discontinuous phase D include acid-containing monomers (e.g., acrylates of itaconic acid, maleic acid, vinyl benzoic acid, or derivatives thereof, or combinations thereof), rheology modifier(s) (e.g., aqueous modifiers including alkylene oxides, such as polypropylene glycols, tetraethylene glycol ether, and diethylene glycol), dispersant(s), co-surfactant(s) (e.g., sodium dodecyl sulfate (SDS), DOWFAX® 2A1 and 30599 (available from The Dow Chemical Co., Midland, Mich.), the EFKA series (available from Ciba Specialty Chemical Inc., Switzerland)), and/or charge generating agents. The loading of such additional components depends, at least in part on the desirable properties of the discontinuous phase D. As one example, the rheology modifier may be added in an amount ranging from about 0.5 wt % to about 30 wt %, depending upon the desirable viscosity.

The addition of the charge generating agents to the mixture (making up the discontinuous phase D) is shown at reference numeral 202 in FIG. 2. It is to be understood that the charge generating agents are generally an ionic species, such as aliphatic acid salts of a medium or long chain aliphatic derivative containing acids or bases. Generally, the aliphatic derivative includes at least 5 carbon atoms. Examples of suitable organic acids that may be part of the aliphatic derivative include oleic, valeric, hexanoic, heptanoic, caprylic, nonanoic, capric, lauric, myristic, palmitic, heptadecanoic, stearic, arachidic, behenic, and lignoceri acids; and examples of suitable inorganic acids that may be part of the aliphatic derivative includes sulfuric, phosphoric, boronic, sulfonic, sulfamic, nitric, nitrous, nitrosulfuric, and pyrophosphoric acids. Examples of suitable bases that may be part of the aliphatic derivative include primary, secondary, tertiary, quaternary, and aromatic amines. Other suitable charge generating agents include ionic surfactants or dispersants. The selection of the charge generating agent is dependent upon the nature of materials being used. For example, in order to disperse hydrophobic particles in water, sodium dodecylsulfate, alkyl-phenyl-disulfonate, laureth sulfate, or AEROSOL® OT can be used.

The selected ionic species promote charging of the resulting polymer-encapsulated particles 22. As such, when the charge generating agent is included, electric field chargeable polymer-encapsulated nanoparticles 22 are formed directly in the non-aqueous solvent medium 12. Such electric field chargeable polymer-encapsulated nanoparticles 22 can be charged and physically manipulated to move in an appropriate dielectric medium. This particular system (i.e., the system including the chargeable polymer-encapsulated nanoparticles 22) may be particularly suitable for any device that operates based on the electrophoretic movement of particles, including, but not limited to, electrophoretic displays and liquid electrophotography.

The desirable charges may be formed in situ. For example, if the surface of the nanoparticle 14, such as pigments, is acidic (having carboxylic acid groups on the surface) the addition of an amine functional dispersant will form a conjugate acid/base, giving rise to charge formation. As such, if the nanoparticle 14 surface is acidic or basic, the nanoparticle 14 itself can generate the desirable charge when subjected to base or acid, respectively.

It is to be further understood that in mixing the components that will form the discontinuous phase D, water or another solvent may be used to get the solid components into solution. When water is not selected to assist in the dissolution of components for the discontinuous phase D, the formation of the emulsion 10 is accomplished without using any water.

Again referring to FIG. 2, the method continues with mixing together the components that will ultimately form the continuous phase C of the mini-emulsion 10. This is shown at reference numeral 204 of FIG. 2. In particular, a non-aqueous medium 12 is mixed with a surfactant and/or dispersant. The resulting medium 12 has the surfactant and/or dispersant dissolved therein.

The non-aqueous medium 12 may be selected from any non-water based solvent in which it is desirable to form the polymer-encapsulated nanoparticles 22. Non-limiting examples of such non-aqueous media include dielectric media, non-oxidative water immiscible media (e.g., petroleum distillates), or other organic solvent media. In one non-limiting example, the non-aqueous media is an isoparaffinic hydrocarbon (such as those in the ISOPAR® series available from Exxon Mobile Corp., Houston, Tex.). In other non-limiting examples, the non-aqueous media includes linear, branched, or cyclic hydrocarbons (such as n-hexanes, heptanes, octane, cyclohexane, dodecane) or mixtures thereof, soy bean oil, vegetable oil, or plant extracts. It is to be understood that when it is desirable to form electric field responsive particles, the medium 12 selected is capable of enabling the movement of such field responsive particles, and is often a dielectric medium.

As previously mentioned, mixed with the non-aqueous medium 12 is a surfactant and/or dispersant. Surfactants are surface active agents, which are generally small molecules (i.e., m.w.<1000 amu) that lower the surface energy of materials. Dispersants can serve the function of a surfactant, but are typically higher in molecular weight (m.w.>2000 amu) and are able to stabilize particles in the continuous phase C. For the non-aqueous continuous phase C disclosed herein, a suitable surfactant includes a sulfosuccinate, such as bis-(2-ethylhexyl)-sulfosuccinate (AOT). As non-limiting examples, the dispersant may be selected from a 100% active polymeric dispersant (e.g., SOLSPERSE® 19000, commercially available from Lubrizol Corp., Wickliffe, Ohio), a solution of a 40% active polymeric dispersant in 240/260 (° C.) aliphatic distillate (e.g., SOLSPERSE® 13940, commercially available from Lubrizol Corp., Wickliffe, Ohio), or other hyperdispersants, such as SOLSPERSE® 11000, 17000, 21000, and 2155 (from Lubrizol Corp., Wickliffe, Ohio).

It is to be understood that the type and/or loading of the surfactant and/or dispersant affects the size of the resulting polymer-encapsulated nanoparticles 22 (shown in FIG. 1B). More particularly, the surfactant loading affects the size of the encapsulated particles 22, and the surfactant and dispersant together affect the dispersion stability of the final system 100. If the loading of the surfactant is increased, the particle 14 size will decrease. Depending upon the surfactant selected (governed, at least in part, by the critical micelle concentration (CMC)), the loading will vary. For example, SDS may be used in an amount that is less than 20 wt % of the pigment (i.e., nanoparticle 14) loading, and the average encapsulated particles 22 size is 250 nm. A loading of less than 20 wt % will result in larger encapsulated particles, up to microns in size. Determining the amount of surfactant and/or dispersant will depend upon, at least in part, the combination of materials used, the surface area of the nanoparticles 14 used in the discontinuous phase D, and the desirable size of the nanoparticle cores 14' after being dispersed. In one embodiment, the total amount of surfactant and/or dispersant ranges from about 0.01 wt % to about 40 wt % of the total weight of the materials used to form the continuous phase C. In a non-limiting example, the total amount of surfactant and/or dispersant ranges from about 0.5 wt % to about 10 wt %.

The continuous phase C may also include additional non-polar additives, such as rheology modifiers. Such non-polar modifiers include oil soluble amine and acid polymers and oligomers. Non-limiting examples include SOLSPERSE® 3000 and 21000 (Lubrizol Corp., Wickliffe, Ohio). The loading of the modifier depends, at least in part, on the application and the desirable viscosity. In one embodiment, the non-polar modifier is present in an amount ranging from about 0.5 wt % to about 30 wt % of the total weight of the continuous phase.

As shown in FIG. 2 at reference numeral 206, the mixture and the non-aqueous medium 12 are mixed together (e.g., in a container 24 shown in FIG. 1A). In one embodiment, the mixture is present in the container 24, and then the surfactant/dispersant dissolved in the non-aqueous medium 12 is added thereto. In another embodiment, the surfactant/dispersant dissolved in the non-aqueous medium 12 is present in the container 24, and then the mixture is added thereto.

The combination of the mixture and the non-aqueous medium 12 is then subjected to high-speed mixing to form a suspension, as shown at reference numeral 208 in FIG. 2. The high-speed mixing is accomplished at a rate greater than or equal to 0.5 krpm for a time sufficient to disperse a majority of the nanoparticles 14, thereby forming nanoparticle cores 14'. In one embodiment, the mixing time ranges from about 0.01 hours to about 10 hours.

The suspension is then microhomogenized to form the inverse mini-emulsion 10 (see reference numeral 210 in FIG. 2 and FIG. 1A). In one embodiment, the container 24 containing the suspension is transferred to a microfluidizer where it is subjected to a predetermined pressure for a predetermined number of cycles or is microfluidized for a particular amount of time. In one embodiment, the shearing pressure is up to 33,000 psi inside the reaction chamber (or higher if the equipment used enables such higher pressures), and the number of cycles ranges from 1 to 6 (where a single cycle is about 5 minutes long at 250 mL/min). In one non-limiting example, the microfluidizer operates at about 240 mL/min. For a 480 mL sample using this microfluidizer, a single cycle may be as low as 2 minutes long. As such, the cycle time may change depending, at least in part, on the microfluidizer used and the sample size. Generally, an under homogenized emulsion will not be stable, and the particle size and size distribution will increase. However, an over homogenized emulsion may lead to separation of the nanoparticles 14 from the monomers 16 or pre-polymers 20. It is believed that if the operation pressure is tuned and controlled throughout the process, over homogenization may be avoided. As such, longer exposure to homogenization generally leads to a more stable and finer emulsion.

It is to be understood that the arrangement of an auxiliary process module (APM) and interaction chamber, which are components of a microfluidizer, used in the process may also affect the size of the suspension. Generally, the size (i.e., diameter) of the interaction chamber may range from 50 μm to 400 μm. In one embodiment, the microfluidizer used has an 87 micron diameter. The interaction chamber diameter affects the size of the emulsion that is prepared, at least in part because a smaller chamber diameter generates higher operational pressure and thus smaller particle sizes. While a microfluidizer is mentioned herein, it is to be understood that any other microhomogenizer may be used to emulsify the components.

It is believed that the conditions and parameters used during microhomogenizing may be controlled to further reduce the size of the nanoparticles 14 such that desirable nanoparticle cores 14' result. In particular, by controlling the pressure and the number of cycles to which the suspension is exposed, the particles 14 may be reduced such that the diameter of each particle core 14' (in the resulting encapsulated particles 22) is less than 500 nm. As one example, the shearing force increases with the amount of pressure applied.

After microhomogenization, the resulting homogeneously mixed suspension is a stable emulsion of the discontinuous phase D in the continuous phase C (as shown in FIG. 1A). It is to be understood that the phases are enlarged in FIG. 1A, and that the discontinuous phase D may be in the form of droplets in the continuous phase C. In one embodiment, the discontinuous phase D droplets are less than 1 μm, and in another embodiment, the discontinuous phase D droplets are less than 500 nm. The emulsion 10 is collected and then exposed to further conditions to generate the polymer-encapsulated nanoparticles 22. Formation of such polymer-encapsulated nanoparticles 22 in the non-aqueous medium 12 from the mini-emulsion 10 will be discussed herein in reference to FIGS. 2 and 1B together.

The emulsion 10 (e.g., still contained in container 24) may be transferred into a reaction vessel (not shown). Polymerization of at least some of the components of the discontinuous phase D is then initiated (see reference numeral 212 of FIG. 2). Initiation of polymerization may be accomplished thermally. It is to be understood that the temperature at which polymerization initiation takes place will depend, at least in part, upon the initiation temperature of the initiator or cross-linker used in the discontinuous phase D. In a non-limiting example, such thermal initiation takes place at a temperature ranging from about 75° C. to about 85° C. The emulsion 10 may be exposed to such temperatures for a time sufficient to complete polymerization (or cross-linking if polymers 18 are part of the starting mixture) and form the coating 26 on the nanoparticle core 14'. In a non-limiting example, the thermal initiation is accomplished for a time ranging from about 0.01 hours to about 10 hours.

Prior to polymerization, the reactor may be purged under a stream of an inert gas. This is accomplished, at least in part, because radicals are susceptible to oxidation by molecular oxygen. Purging the reaction vessel can help displace some oxygen to prevent extensive quenching of radicals generated from the initiator. Furthermore, the reactor may be equipped with a water condenser, which helps to reintroduce the evaporated continuous phase C back into the reaction vessel.

The resulting system 100 is shown schematically in FIG. 1B. The system 100 includes the encapsulated particles 22 formed directly in the desired non-aqueous medium 12. The polymer-encapsulated nanoparticles 22 include the nanoparticle core 14' and the polymer coating 26 established thereon. Since the particles 22 are formed in situ, additional water removal or solvent exchange steps are not required.

The resulting coating 26 may, in some embodiments, be covalently bonded to the nanoparticle core 14' if there are olefinic double bonds on the particle 14 surface to react with added monomers 16. Otherwise, the coating 26 is non-covalently bonded, and is held to the surface of the particle core 14' initially by non-bonding interactions such as van der Waals forces, hydrogen bonding, acid/base interaction, and Zwitterionic interactions. Once polymerization begins, and cross-linking of the resulting polymers takes place, the polymers are physically entangled with the surface of the nanoparticle cores 14'.

As mentioned hereinabove, when a charge controlling agent is incorporated into the discontinuous phase D, the resulting coating 26 may be charged in the presence of an electric field. Upon exposure of the particles 22 to such a field, the particles 22 may be moved in a predetermined manner. Such chargeable particles 22 may be particularly suitable for display and other electronic applications.

It is to be understood that the embodiments of the method disclosed herein may be performed as a one container process (i.e., the formation of the emulsion 10 and polymerization thereof occurs in the same container).

To further illustrate embodiment(s) of the present disclosure, the following examples are given herein. It is to be understood that these examples are provided for illustrative purposes and are not to be construed as limiting the scope of the disclosed embodiment(s).

EXAMPLE 1

A 1 L Erlenmeyer flask was charged with 10 mL diethylene glycol and 10 mL water. 1 g of 2,2'-Azobis(2-methylpropionamidine) dihydrochloride and 40 g of acrylamide were added to the flask. The solvent and water were used to dissolve the solid acrylamide. Subsequently, 30 g of Heubach 515400 pigments were stirred into the glycol solution to form a pasty solid. 1 L of ISOPAR® L containing 2 wt % SOLSPERSE® 19000 was added to the pigment paste. The heterogeneous mixture underwent primary dispersion by mechanical stirring at 1000 rpm for 30 minutes under a stream of argon, and then was further dispersed by microfluidization in a MICROFLUIDIZER® (model 110-Y with an 87 micron interaction chamber) at 60 to 80 applied psi (an internal shear pressure of approximately 20 kpsi). The solution cycled through 3 times, and was then collected into a reactor equipped with 2 impellers, a stirring mechanism, a condenser, and purged with argon for 5 minutes prior to the thermally initiated polymerization at 80° C. The reaction proceeded for 8 hours under argon. Upon completion of reaction, the dispersion was allowed to cool to room temperature. The dispersion was screened through a 10 micron aluminum screen to remove larger particulates to give an oil-based dispersion of encapsulated nanoparticles.

EXAMPLE 2

1 g of 4,4'-Azobis(4-cyanovaleric acid), 2 g of aluminum stearate (as a charge controlling agent), and 40 mL of methacrylic acid were added to a 1 L Erlenmeyer flask. Subsequently, 20 g of Clariant B-PFS pigments were stirred into the monomer mixture to form a pasty solid. 1 L of ISOPAR® containing 2.5 wt % SOLSPERSE® 13940 was added the pigment paste. The heterogeneous mixture underwent primary dispersion by mechanical stirring at 1000 rpm for 30 minutes under a stream of argon, and then was further dispersed by microfluidization in a MICROFLUIDIZER® (model 110-Y with an 87 micron interaction chamber) at 60 to 80 applied psi (an internal shear pressure of approximately 20 kpsi). The solution cycled through 3 times, and was then collected into a reactor equipped with 2 impellers, a stirring mechanism, a condenser, and purged with argon for 5 minutes prior to the thermally initiated polymerization at 80° C. The reaction proceeded for 8 hours under argon. Upon completion of reaction, the dispersion was allowed to cool to room temperature. The dispersion was screened through a 10 micron aluminum screen to remove larger particulates to give an oil-based dispersion of encapsulated nanoparticles.

EXAMPLE 3

A 1 L Erlenmeyer flask was charged with 10 mL of toluene-diisocyanate and 40 g of Versathane 1090.25 g of Degussa Printex 25 was stirred into this viscous mixture to form a pasty solid. 1 L of ISOPAR® containing 2.5 wt % SOLSPERSE® 13940 was added to the pigment paste. The heterogeneous mixture underwent primary dispersion by mechanical stirring at 1000 rpm for 30 minutes under a stream of argon, and then was further dispersed by microfluidization in a MICROFLUIDIZER® (model 110-Y with an 87 micron interaction chamber) at 60 to 80 applied psi (an internal shear pressure of approximately 20 kpsi). The solution cycled through 3 times, and then was collected into a reactor equipped with 2 impellers, a stirring mechanism, a condenser, and purged with argon for 5 minute prior to the thermally initiated polymerization at 80° C. The reaction proceeded for 8 hours under argon. Upon completion of reaction, the dispersion was allowed to cool to room temperature. The dispersion was screened through a 10 micron aluminum screen to remove larger particulates to give an oil-based dispersion of encapsulated nanoparticles.

EXAMPLE 4

Figures 3A, 3B, 3C:
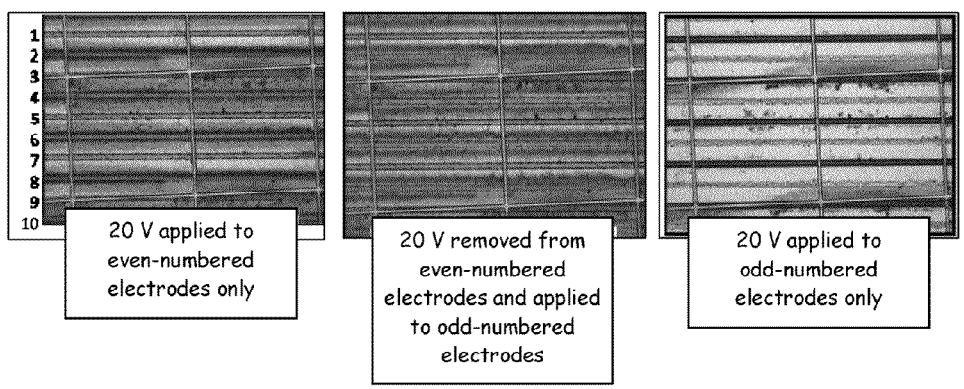
FIGS. 3A through 3C are photographs of electrodes coated with polymer-encapsulated nanoparticles when a voltage is applied to only the even-numbered electrode (FIG. 3A), the voltage is removed from the even-numbered electrodes and applied to the odd-numbered electrodes (FIG. 3B), and to only the odd-numbered electrodes (FIG. 3C).

The particles from Example 1, Example 2, or Example 3 are incubated in ISOPAR® L with additional dispersants (e.g., from 5 wt % to 20 wt % of a combination of a SOLSPERSE® hyperdispersant and a dispersant available from Chevron Oronite) as charge generating agents. This dispersion is loaded into an in-plane Gordon cell (similar to that shown in FIGS. 3A through 3C). It is to be understood that the electrodes of the in-plane Gordon cell in these Figures are numbered from 1-10. As shown in these Figures, the encapsulated particles (the black speckles) migrate from one electrode to another, depending upon the voltages that are applied and removed. As a particular electric field is applied, the particles are coated onto certain electrodes via electrophoretic movements. FIG. 3A illustrates particle movement when 20V is applied to the even-numbered electrodes of the cell. As shown, the encapsulated particles migrate towards those electrodes. FIG. 3B illustrates particle movement when the voltage from the even-numbered electrodes is removed and the same voltage is applied to the odd-numbered electrodes. As illustrated, the coated particles begin to move toward the odd-numbered electrodes and away from the even-numbered electrodes. FIG. 3C illustrates the complete switch of the particles from concentrating at the even-numbered electrodes (FIG. 3A) to concentrating at the odd-numbered electrodes.

While several embodiments have been described in detail, it will be apparent to those skilled in the art that the disclosed embodiments may be modified. Therefore, the foregoing description is to be considered non-limiting.

What is claimed is:

1. A method for forming a system including polymer-encapsulated nanoparticles, the method comprising:
   mixing at least one of i) a polar, water-soluble, or water-miscible monomer, or ii) a polar, water-soluble, or water-miscible pre-polymer in a non-aqueous solvent and a plurality of nanoparticles having a polar surface selected from the group consisting of carbon black, copper phthalocyanine, titania, and silica to form a mixture of components;
   forming an inverse mini-emulsion including a continuous phase of a non-aqueous medium and a discontinuous phase of the mixture of components; and
   initiating polymerization of the at least one of the monomer or the prepolymer to form a polymer coating on each of the plurality of nanoparticles in the non-aqueous medium;
   wherein the forming of the inverse mini-emulsion is accomplished in the absence of water.

2. The method as defined in claim 1 wherein initiating polymerization of the inverse mini-emulsion is accomplished at a predetermined temperature.

3. The method as defined in claim 2, further comprising including a crosslinker and an initiator in the mixture of components that forms the discontinuous phase.

4. The method as defined in claim 1, further comprising including a charge generating component in the mixture of components that forms the discontinuous phase.

5. The method as defined in claim 1, further comprising including at least one of a surfactant, a dispersant, a crosslinker, an initiator, a rheology modifier, and an acid-group containing monomer in the mixture of components that forms the discontinuous phase.

6. The method as defined in claim 1, further comprising adding a polar, water-soluble, or water-miscible polymer to the mixture of components that forms the discontinuous phase.

7. The method as defined in claim 1 wherein each of the plurality of nanoparticles with the polymer coating thereon has a diameter that is less than 1 micron.

8. A method for forming a system including polymer-encapsulated nanoparticles, the method comprising:
   forming an inverse mini-emulsion including a continuous phase of a non-aqueous medium and a discontinuous phase of at least: a plurality of nanoparticles having a polar surface, and at least one of i) a polar, water-soluble, or water-miscible monomer, or ii) a polar, water-soluble, or water-miscible pre-polymer; and
   initiating polymerization of the at least one of the monomer or the prepolymer to form a polymer coating on each of the plurality of nanoparticles in the non-aqueous medium;
   wherein the forming the inverse mini-emulsion includes:
   mechanically mixing the plurality of nanoparticles, a radical initiator, and the at least one i) the polar, water-soluble, or water-miscible monomer, or ii) the polar, water-soluble, or water-miscible pre-polymer, thereby forming a mixture;
   adding a surfactant or dispersant dissolved in the non-aqueous medium to the mixture;
   subjecting the mixture to mixing at a rate greater than or equal to 0.5 k rpm to form a suspension; and
   microhomogenizing the suspension at a predetermined pressure for a predetermined number of cycles.

9. The method as defined in claim 8 wherein microhomogenizing includes exposing the suspension to a pressurized chamber, wherein the predetermined pressure is up to 33,000 psi, and wherein the predetermined number of cycles ranges from 1 to 6, where each cycle is 5 minutes at 250 mL/min.

10. The method as defined in claim 8, further comprising adding a charge generating component during the mechanically mixing step.

11. The method as defined in claim 10 wherein the charge generating component is an aliphatic acid salt of a chain aliphatic derivative, the chain aliphatic derivative containing one of acids or bases, wherein the chain aliphatic derivative includes at least 5 carbon atoms, and wherein the acids are selected from oleic, valeric, hexanoic, heptanoic, caprylic, nonanoic, capric, lauric, myristic, palmitic, heptadecanoic, stearic, arachidic, behenic, lignoceri, sulfuric, phosphoric, boronic, sulfonic, sulfamic, nitric, nitrous, nitrosulfuric, and pyrophosphoric acids, or wherein the bases are selected from primary, secondary, tertiary, quaternary, and aromatic amines.

12. The method as defined in claim 8 wherein an amount of the surfactant ranges from about 0.01 wt % to about 40 wt % of a total weight of the surfactant or dispersant dissolved in the non-aqueous medium.

13. A method for forming a system including polymer-encapsulated nanoparticles, the method comprising:
   forming an inverse mini-emulsion including a continuous phase of a non-oxidative water immiscible non-aqueous dielectric medium and a discontinuous phase of at least:
   a plurality of solid nanoparticles having a polar surface, and at least one of i) a polar, water-soluble, or water-miscible monomer, or ii) a polar, water-soluble, or water-miscible pre-polymer;
   wherein the forming of the inverse mini-emulsion includes:
   mechanically mixing the plurality of solid nanoparticles, a radical initiator, and the at least one i) polar, water-soluble, or water-miscible monomer, or ii) polar, water-soluble, or water-miscible pre-polymer, thereby forming a mixture;
   adding a surfactant or dispersant dissolved in the non-aqueous dielectric medium to the mixture;
   subjecting the mixture to mixing at a rate greater than or equal to 0.5 k rpm to form a suspension; and
   microhomogenizing the suspension at a predetermined pressure for a predetermined number of cycles; and
   initiating polymerization of the at least one of the monomer or the prepolymer to form a polymer coating directly on each of the plurality of nanoparticles in situ in the non-aqueous dielectric medium, each polymer-encapsulated particle having a diameter that is less than 1 micron;
   wherein the polymer coating on each of the plurality of nanoparticles forms a conjugate acid or base with an ionic species to promote charging of the polymer coating, wherein the ionic species is an aliphatic acid salt of a chain aliphatic derivative, the chain aliphatic derivative containing an acid or a base, wherein the chain aliphatic derivative includes at least 5 carbon atoms, and wherein the acids are selected from valeric, hexanoic, heptanoic, caprylic, nonanoic, capric, myristic, palmitic, heptadecanoic, stearic, arachidic, behenic, lignoceri, phosphoric, boronic, sulfonic, sulfamic, nitric, nitrous, nitrosulfuric, and pyrophosphoric acids.

14. The method as defined in claim 13 wherein the forming of the inverse mini-emulsion is accomplished in the absence of water.

15. The method as defined in claim 13, further comprising adding the ionic species during the mechanically mixing step.

16. The method as defined in claim 13, further comprising including the ionic species in the discontinuous phase.

* * * * *

UNITED STATES PATENT AND TRADEMARK OFFICE
CERTIFICATE OF CORRECTION

| | | |
|---|---|---|
| PATENT NO. | : 9,018,313 B2 | Page 1 of 1 |
| APPLICATION NO. | : 13/692174 | |
| DATED | : April 28, 2015 | |
| INVENTOR(S) | : Doris Pik-Yiu Chun et al. | |

It is certified that error appears in the above-identified patent and that said Letters Patent is hereby corrected as shown below:

Title page, item (74), Attorney, in column 2, line 1, delete "Dierker & Assocaties, P.C." and insert -- Dierker & Associates, P.C. --, therefor.

Signed and Sealed this
Twenty-fourth Day of November, 2015

Michelle K. Lee
*Director of the United States Patent and Trademark Office*